United States Patent [19]

Suzuki

[11] Patent Number: 4,894,722
[45] Date of Patent: Jan. 16, 1990

[54] PROMPTER

[75] Inventor: Nobuo Suzuki, Omiya, Japan

[73] Assignee: Fuji Photo Optical Co., Ltd., Saitama, Japan

[21] Appl. No.: 276,806

[22] Filed: Nov. 28, 1988

[30] Foreign Application Priority Data

Dec. 4, 1987 [JP] Japan .............................. 62-306933

[51] Int. Cl.⁴ ............................................. H04N 5/222
[52] U.S. Cl. ................................... 358/225; 358/185; 358/224
[58] Field of Search ................... 358/209, 158, 224, 3, 358/92, 225; 340/705

[56] References Cited

U.S. PATENT DOCUMENTS

| | | | |
|---|---|---|---|
| 2,934,601 | 4/1960 | Oppenheimer | 358/185 |
| 4,303,322 | 12/1981 | Someya | 358/224 |
| 4,403,216 | 9/1983 | Yokoi | 340/705 |
| 4,485,409 | 11/1984 | Schumacher | 358/93 |
| 4,652,870 | 3/1987 | Steward | 340/705 |

Primary Examiner—Jin F. Ng
Assistant Examiner—Stephen Brinich
Attorney, Agent, or Firm—Oliff & Berridge

[57] ABSTRACT

A prompter is disclosed which displays manuscripts and the like for a news caster in front of a TV camera for photographing the news caster. In the prompter, the manuscripts are displayed on a liquid crystal display panel and the manuscripts on the liquid crystal display panel are enlargedly projected on a screen in front of the TV camera. In the prompter, as a manuscripts display part, there is employed the liquid crystal display panel and, therefore, the TV camera can be reduced in weight and thus the operationability of the TV camera can also be improved.

5 Claims, 3 Drawing Sheets

PROMPTER

BACKGROUND OF THE INVENTION

1. Field of the Invention

The present invention relates to a prompter and, in particular, to a prompter which photographs manuscripts for TV broadcasting or the like by means of a camera such as video camera or the like and displays the manuscripts or the like in front of a taking lens of a TV camera.

2. Description of the Related Art

Recently, in many TV broadcasting stations, there has been used a prompter which projects and displays news manuscripts for a news caster in front of a taking lens of a TV camera.

The prompter of this type, as shown in FIG. 3, comprises a video camera 4 which is used to photograph materials 2 such as news manuscripts and the like, a television 6 of a cathode ray tube type which displays the materials in accordance with video signals from the video camera 4, and a half mirror 8 which is used to display the images that are present on the television 6.

Owing to this, a news caster 9 can perform his or her role, that is, can give a new commentary and the like while observing the materials 2 being displayed on the television 6 through the half mirror 8.

However, in the above-mentioned conventional prompter, the television 6 and the half mirror 8 are disposed in front of the taking lens 10A of the TV camera 10 by means of an arm 12 mounted to the body of the TV camera 10. Also, in the above prompter, in order that the manuscripts can be seen by the news caster 9 from a place several meters away from the manuscripts, the manuscripts must be displayed in a large way on the television 6 of a big size. Therefore, in the prompter employing such television 6, the center of gravity of the whole TV camera 10 is situated forwardly (that is, on the side of the taking lens 10A), namely, the camera is ill-balanced, which makes it difficult to operate the camera.

In order to avoid the above-mentioned drawbacks, if a counter-weight is used to adjust the balance of the gravity, then the gross weight of the TV camera 10 is increased, which greatly reduces the operationability of the TV camera 10, that is, a camera panning operation, a camera tilting operation and the like are restricted to a great degree.

SUMMARY OF THE INVENTION

The present invention aims at eliminating the drawbacks found in the above-mentioned prior art prompter.

Accordingly, it is an object of the invention to provide a prompter which is capable of displaying in an enlarged manner materials such as news manuscripts and the like in front of a TV camera without lowering the operationability of the TV camera.

In order to attain the above object, according to the invention there is provided a prompter which photographs materials such as manuscripts for broadcasting and the like by means of a video camera and displays the materials in front of a taking lens of a TV camera, the prompter comprising: transmissible liquid crystal display means for displaying the materials in accordance with a video signal from the video camera; a light source for illuminating the display of the transmissible liquid crystal display means; a screen for projecting optical images displayed by the transmissible liquid crystal display means by means of a projection lens system; and, a half mirror disposed in front of a taking lens of the TV camera for displaying the optical images of the screen.

In the prompter according to the invention, the materials such as the broadcasting manuscripts and the like photographed by the video camera are displayed by the transmissible liquid crystal display means, and the display portion of the transmissible liquid crystal display means is illuminated by the light source. Also, the optical images on the display portion of the transmissible liquid crystal display means are projected on the screen and the optical images on the screen are then displayed by the half mirror.

As a result of the use transmissible liquid crystal display means, the prompter according to the invention is reduced in weight and is also capable of displaying the materials such as broadcasting news manuscripts and the like enlargedly in front of the TV camera without lowering the operationability of the TV camera.

Also, in the prompter according to the invention, a high transmittance half mirror can be used by increasing the amount of light of the above-mentioned light source. In other words, in the prior art prompters, a half mirror is constructed such that it has a transmittance on the order of 70% and a reflection factor on the order of 30% and, therefore, in order to pick up a clear image of an object (newscaster), the object must be illuminated by the illumination of high brightness. However, according to the present invention, by increasing the amount of light (brightness) of the light source, the reflection factor of the half mirror can be held down to several percent and thus the transmittance of the half mirror can be enhanced. As a result, a clear image of the object can be obtained without illuminating the object by the illumination of high brightness.

BRIEF DESCRIPTION OF THE DRAWINGS

The exact nature of this invention, as well as other objects and advantages thereof, will be readily apparent from consideration of the following specification relating to the accompanying drawings in which like reference characters designate the same or similar parts throughout the figures thereof and wherein.

DETAILED DESCRIPTION OF THE INVENTION

A detailed description will follow of a preferred embodiment of a prompter according to the present invention with reference to the accompanying drawings.

Figure 1:
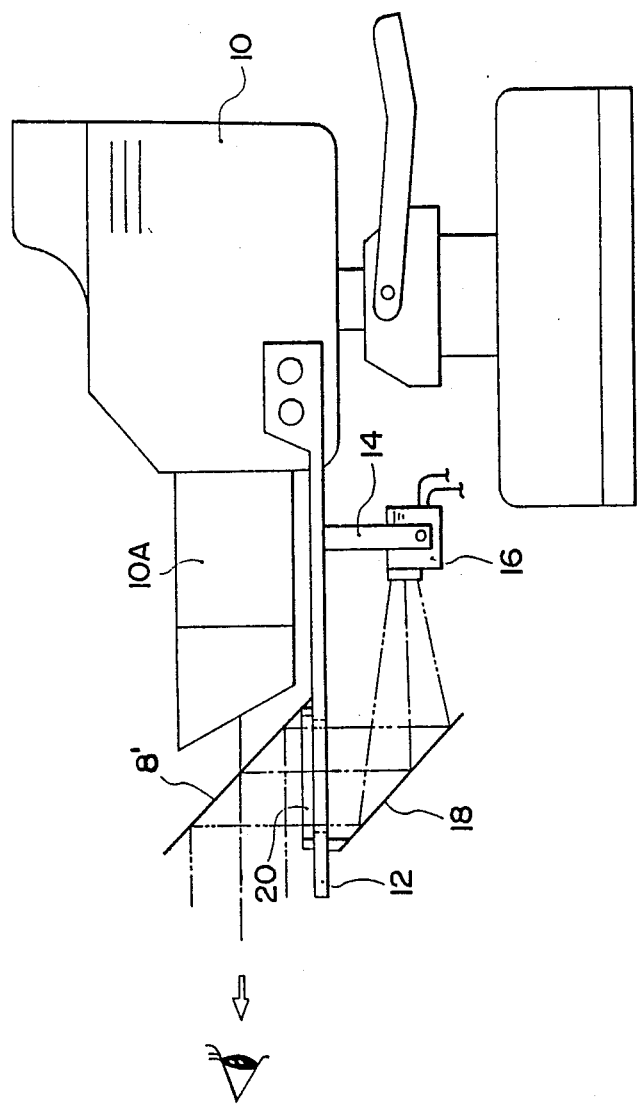
FIG. 1 is an external appearance view of a prompter according to the invention.
Figure 3:
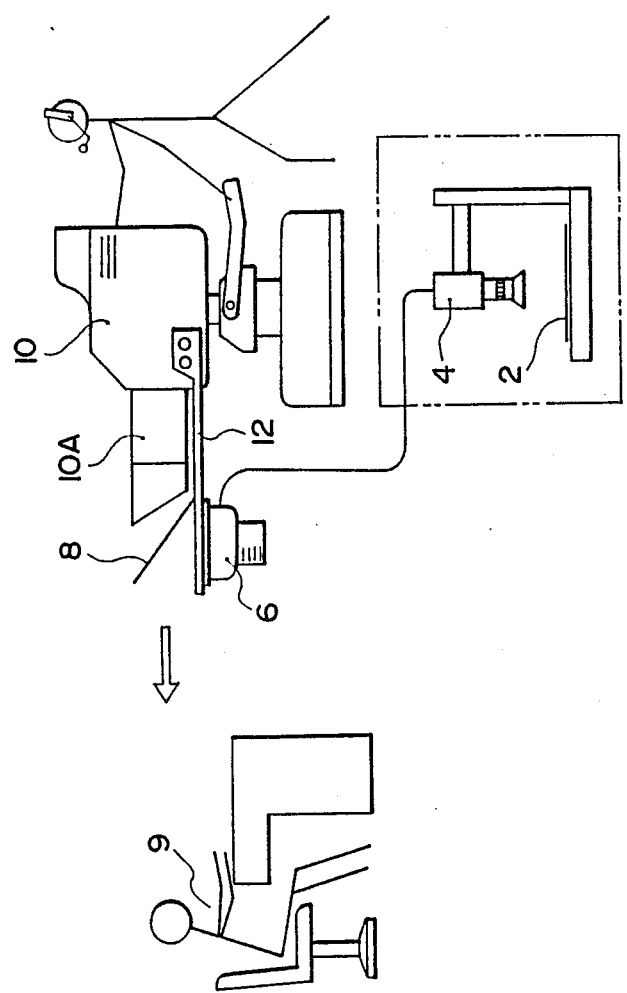

Referring first to FIG. 1, there is shown the external appearance of a prompter according to the present invention. In FIG. 1, the same parts as shown in FIG. 3 are given the same reference characters and the description thereof is omitted here.

The prompter shown in FIG. 1 comprises a projection part 16 in the lower portion thereof and supported by means of a support 14 provided in an arm 12, a reflecting mirror 18 disposed in front of the projection part 16, a screen 20 above the reflecting mirror 18, and a half mirror 8' disposed above the screen 20.

Figure 2:
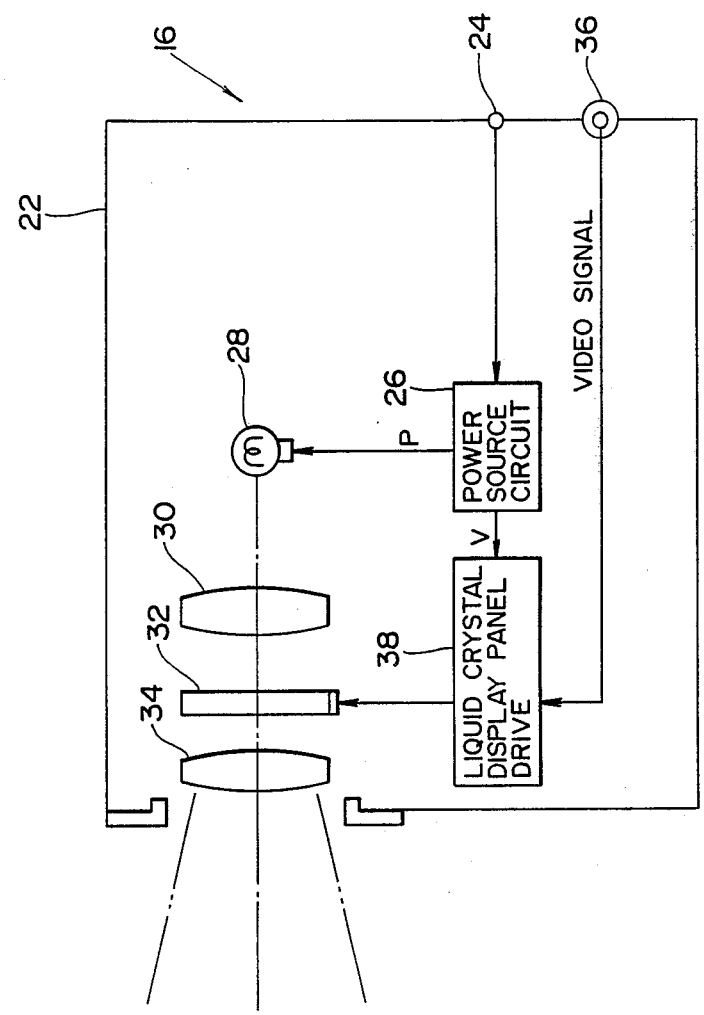
FIG. 2 is a view of the structure of a projection part of the above prompter; and, FIG. 3 is a view of the whole structure of a conventional prompter.

The projection part 16, as shown in FIG. 2, comprises a casing 22, a power source terminal 24, a power source circuit 26, a light source 28, a group of condenser lenses 30, a transmissible liquid crystal panel 32, a group of projection lenses 34, a signal terminal 36, and a liquid crystal panel drive circuit 38.

The power source terminal 24 is connected to a commercial power source so that an AC voltage v can be supplied to the power source circuit 26.

The power source circuit 26 converts the AC power P to a low AC or (DC) power Pv or converts the AC voltage v to a low DC voltage (power source voltage) V, and also supplies the power Pv and power source voltage V to the light source 28 and liquid crystal panel drive circuit 38, respectively.

The condenser lens group 30 collects the light from the light source 28 and illuminates the collected light onto the back surface of the liquid crystal panel 32.

The liquid crystal panel 32 is used to display an image such as a character or the like and it is small in size and light in weight. The liquid crystal panel 32 is composed of a plurality of liquid crystal cells to which a drive pulse from the liquid crystal panel drive circuit 38 is applied.

The liquid crystal panel drive circuit 38 produces the drive pulse in accordance with a video signal inputs thereto through the signal terminal 36 from a video camera (not shown), and outputs the drive signal to the liquid crystal panel 32 so that the image such as a character and the like can be displayed.

The projection lens group 34 projects the images displayed by the liquid crystal panel 32 on the reflecting mirror 18. The projection lens group 34 is arranged such that the projection magnification and focussing thereof can be adjusted.

The reflecting mirror 18 is disposed in an inclined manner on the optic axis of the projection lens group 34. Thanks to this, the light from the projection part 16 can be reflected in the direction of the screen 20. The images on the screen 20 are reflected in the direction of the news caster by the half mirror 8' disposed on the optic axis of the TV camera 10.

In the prompter constructed in the above-mentioned manner, the manuscripts that have been photographed by the TV camera 10 are displayed on the liquid crystal panel 32 of the projection part 16. The images displayed on the liquid crystal panel 32 are illuminated by the light from the light source 28 and the images on the liquid crystal panel 32 are enlarged and projected onto the reflecting mirror 18 by means of the projection lens group 34. The optical images on the reflecting mirror 18 are projected on the screen 20 and are further displayed on the half mirror 8'. In this manner, the news caster can offer a news commentary and the like while observing the materials displayed on the half mirror 22.

As discussed above, in the prompter shown in the present embodiment, the optical images that appear on the small-sized and light-weight transmissible liquid crystal panel 32 are illuminated from behind by the light source 28 and, at the same time, the optical images of high brightness that have transmitted through the liquid crystal panel 32 are enlarged and projected by the projection lens group 34 and the enlarged and projected optical images can be displayed through the reflecting mirror 18 and screen 20 onto the half mirror 8'. Due to this construction, the images of the materials such as the news manuscripts and the like can be displayed in front of the taking lens 10A of the TV camera 10 while they are enlarged to such a degree that the news caster and the like is able to observe with ease. Also, the prompter according to the present invention is reduced in weight over the conventional prompter by using the transmissible liquid crystal panel in place of a television which has been used in the conventional prompter and, therefore, in the prompter to the invention, there is eliminated the possibility that the center of gravity of the TV camera 10 may be shifted greatly toward the taking lens 10A and also the camera can be operated more easily.

In the prompter shown in the present embodiment, the optical images from the projection part 16 are projected in an enlarged manner on the screen 20 indirectly, that is, by means of the reflecting mirror 18. However, the invention is not always limited to this, but the optical images from the projection part 16 may be enlarged and projected directly on the screen 20.

As has been described hereinbefore, in the prompter according to the present invention, the materials such as the broadcasting manuscripts and the like that have been photographed by the video camera are displayed on the transmissible liquid crystal display means and the images on the display portion of the transmissible liquid crystal display means are enlarged and displayed in front of the taking lens of the TV camera. Therefore, the invention can be constructed light weight and the images of the materials such as the news manuscripts and the like can be displayed in an enlarged manner without impairing the operationability of the TV camera.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A prompter comprising:
    a video camera for photographing materials such as broadcasting manuscripts and the like;
    a projection unit disposed in front of a TV camera and including a transmissible liquid crystal display panel for displaying said materials as optical images in accordance with a video signal from said video camera, a drive circuit for driving said liquid crystal display panel, a light source for illuminating said liquid crystal display panel from behind, a group of condenser lenses for collecting light from said light source onto said liquid crystal display panel, and a group of projection lenses for enlargedly projecting the display images of said liquid crystal display panel;
    a screen disposed in front of said TV camera for displaying the optical images that have been enlargedly projected by said group of projection lenses of said projection unit; and
    a half mirror disposed in front of a taking lens of said TV camera and inclined obliquely for displaying said optical images on said screen.

2. A prompter as set forth in claim 1, further including a reflecting mirror disposed in an inclined manner in front of the projection unit, wherein said optical images enlargedly projected by said projection lenses of said projection unit are reflected by said inclined reflecting mirror to be displayed on said screen, and said optical images on said screen are further reflected by said half mirror so that a person to be photographed by said TV camera can view said optical images.

3. A prompter as set forth in claim 2, wherein said projection unit is disposed on an arm below said taking lens of said TV camera, said optical images enlargedly projected by said projection lenses of said projection unit are reflected upwardly by 90° by said reflecting mirror, which is inclined by 45°, and are then projected onto said screen which is horizontally oriented, and said optical images on said screen are reflected by said half mirror, which is disposed in front of said taking lens of said TV camera and inclined by 45°.

4. A prompter as set forth in claim 3, wherein said group of projection lens is arranged such that the projecting magnifications and focuses thereof can be adjusted.

5. A prompter as set forth in claim 1, wherein the brightness of said light source can be increased so that said half mirror can be formed to have a lower reflection factor.

* * * * *